Oct. 6, 1931.  E. N. EHRHART ET AL  1,826,655
PROCESS FOR PREPARING REFINED SIRUPS
Filed Feb. 12, 1930
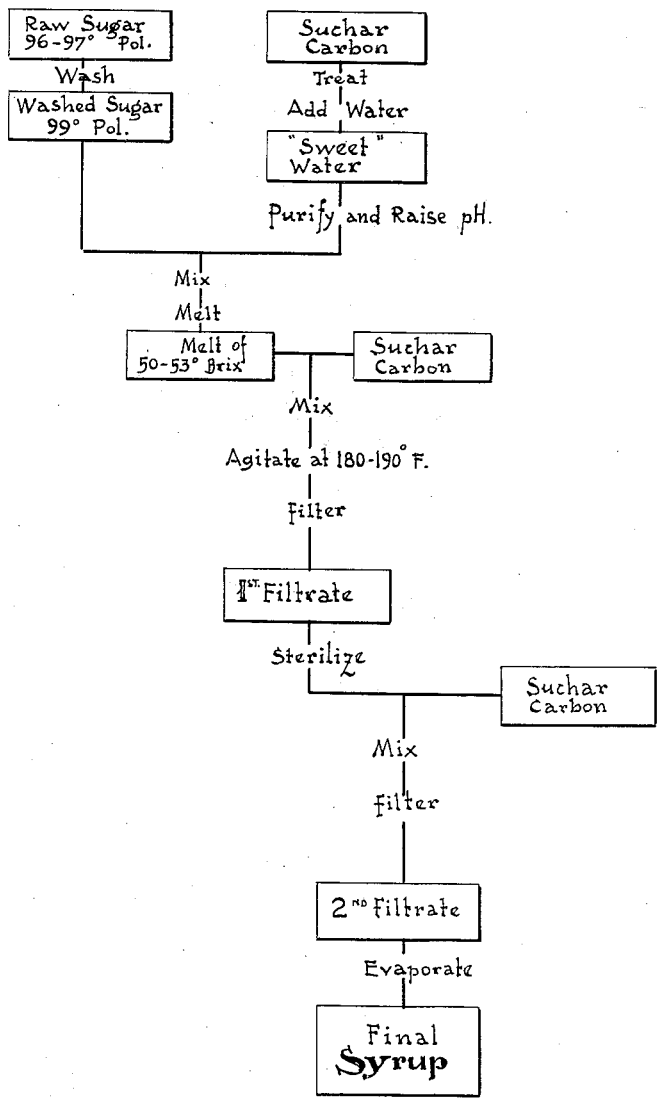

Patented Oct. 6, 1931

1,826,655

UNITED STATES PATENT OFFICE

EUGENE N. EHRHART, OF BROOKLYN, AND LEONARD WICKENDEN, OF MANHASSET, NEW YORK, ASSIGNORS TO JOHN J. NAUGLE, OF GREENWICH, CONNECTICUT

PROCESS FOR PREPARING REFINED SIRUPS

Application filed February 12, 1930. Serial No. 427,680.

Our present invention relates to methods of preparing refined, substantially water-white sirups and aims to devise methods of the general character specified which are simple, which may be easily and conveniently practised and which permit the manufacture, preferably directly from raw sugars, of a high-grade, refined sirup characterized by its substantially water-white character, its content of a moderate percentage of invert sugar, and its great usefulness in many fields having to do with foods, confections and the like. Other objects and advantages of the methods of the present invention will in part be pointed out in detail hereinafter and will in part be obvious to those skilled in the art to which the present invention relates.

In the accompanying specification we shall describe and in the annexed drawing more or less diagrammatically exemplify, several illustrative embodiments of the methods of the present invention. It is, however, to be clearly understood that our invention is not limited to the specific embodiments thereof herein described and more or less diagrammatically exemplified for purposes of illustration only.

Referring to the drawing, in which the aforesaid illustrative embodiments of the methods of the present invention are more or less diagrammatically exemplified, the single figure of the drawing is a diagrammatic view schematically exemplifying the aforesaid illustrative embodiment of the methods of the present invention.

Referring now to the aforesaid illustrative embodiments of the methods of the present invention, and with general reference to the diagrammatic drawing more or less schematically representing the various operations or steps of such methods, our starting or raw material is preferably raw sugar having an average polarization of from about 96 to about 97 degrees. Ordinarily we use raw cane sugar such as Cuban raw, although, of course, raw cane sugar from other sources, as from Porto Rico, the Philippines, the Hawaiian Islands, Santo Domingo and Haiti may be used with equal success, as well as raw sugars derived from other sources.

We now proceed to wash the raw sugar. This we may do in centrifugals in accordance with the practice hitherto prevailing. In these centrifugals the sugar is washed to a purity of about 99 degrees polarization. It may here be stated that the initial unwashed raw sugars whose polarization is from about 96 degrees to about 97 degrees contains, in addition to the sucrose, in the case of sugar of 97 degrees polarization, for example, about 1 per cent. of invert sugar, about ½ per cent. of ash, about 1½ per cent. of organic impurities and about 1 per cent. of water. The washed raw sugar on the other hand having a purity of about 99 degrees polarization, contains about 1 per cent. of invert sugar and organic impurities, about ½ per cent. ash and about ½ per cent. water.

The result of the washing operation is therefore to obtain washed raw sugar of the designated purity and composition and the type of sirups known as "affinations". These affinations are preferably boiled in a vacuum pan to obtain raw sugar, the final by-product being molasses. The raw sugar obtained from boiling the affinations is preferably mixed with the incoming raw sugar and washed in the manner already indicated above.

The next step of the operation is the melting of the washed sugar. This is preferably carried out in the following manner: We prefer to carry out the melting operation at a temperature of about 150 degrees F. While the sugar may be melted in pure hot water, we prefer to melt the same in hot "sweet" water, that is, in water which contains some sugar values, as the sugar values derived by treating the purifying and filtering media subsequently described to remove the last traces of sugar therefrom. In either event, however, we prefer that the water used for melting, whether ordinary water or "sweet" water, shall be substantially free from iron. For this purpose we may treat either the ordinary water or the "sweet" water with a suitable reagent, such as a solution of disodium phosphate, to precipitate the iron which may afterwards be removed by decantation or filtration, as desired. We prefer also to treat the ordinary or "sweet" water with an agent which will tend to raise its pH and thus lower the hydrogen ion concentration both of the water used for melting and of the resulting melt.

At this point it may be desirable to point out that whereas the hydrogen ion concentration of the washed raw sugar melt without treatment would ordinarily be from about 6.0 to about 6.5, where the melt has been treated, as by the treatment of the ordinary water or "sweet" water used for melting with disodium phosphate, the pH will be raised to about 7.3 corresponding to a diminished hydrogen ion concentration. This is an important feature if the amount of invert sugar present in the final melt is to be kept at a relatively low figure. Accordingly, we use a slight excess of disodium phosphate, which reagent will therefore serve not only to precipitate iron, but also to raise the pH reading and thus lower the hydrogen ion concentration.

Where, as is preferred, "sweet" water is used for melting the washed raw sugar, the amount of disodium phosphate used, both for precipitating iron and for increasing the pH reading and thus for lowering the hydrogen ion concentration may range from about 20 to about 50 pounds of the crystalline disodium salt per 2000 gallons of "sweet" or other water used for the melting process. This would correspond to from about 8 to about 20 pounds of the anhydrous salt per 2000 gallons of "sweet" or other water used for the melting operation.

We prefer that the density of the resulting melt shall be from about 50 to about 53 degrees Brix. It is desirable in general, of course, to have the melt as concentrated as possible. On the other hand, with a melt of a density exceeding about 53 degrees Brix we have discovered that the precipitation of the iron and like impurities will be retarded and, if the density of the sirup is much higher, will be almost completely prevented. We have found that working with a density range for the melt of about 50 and about 53 degrees Brix the desired results can be obtained in the most effective and convenient manner.

The melt thus obtained is now subjected to a further purification to remove undesirable color, taste and odor. While various methods may be employed for this purpose, we prefer among others to employ the following purification operations, since the same will be found to yield a purified sirup of the desired properties, both as to color, taste and odor. In accordance with the aforesaid illustrative embodiments of the methods of the present invention, we may therefore proceed as follows to purify the melt obtained as above described:

We now treat the melt with a suitable amount of a decolorizing carbon, preferably a decolorizing carbon of vegetable origin, such as the highly activated decolorizing carbon known to the trade as "suchar" which is derived from carbonized lignin residues and is adapted to be revivified any number of times with complete restoration of its decolorizing powers. Not only is this true of the carbon "suchar" but it also has the additional property, very important for the purposes of the present invention, that it is substantially neutral and will not therefore substantially effect the pH reading of the melt and thus introduce factors which might upset the practise of the process and might increase inversion of the sucrose, factors which generally follow from the use of other types of carbon.

The decolorizing carbon "suchar" is covered by United States Letters Patent No. 1,701,272, dated February 5, 1929, and entitled "Electric furnace products".

Ordinarily, where the "suchar" is used, we use an amount of "suchar" equal to about 2 per cent. of the weight of the sugar solids present in the melt. The mixture of melt and suspended carbon is thoroughly agitated in a tank, the melt being preferably heated to and maintained at a temperature of from about 170 to about 200 degrees F., as about 180 or 190 degrees F. The mixture of melt and suspended carbon is now pumped into a suitable filter, such as the well-known type of "auto" filter. The clear liquor coming from the filter is known as the first filtrate and will have often a hydrogen ion concentration corresponding to a pH reading or about 5.0.

The first filtrate is now preferably treated with a suitable sterilizing agent and also with an agent which will render the impurities contained in it more readily amenable to coagulation and removal by a subsequent purifying treatment. For this purpose we prefer to treat the first filtrate with an agent which is capable of generating an oxidizing agent in the melt, preferably a nascent oxidizing agent. We prefer to use reagents which will generate chlorine, preferably nascent chlorine, in the melt or hypochlorous acid in the melt. For this purpose we may use a small quantity of bleach liquor, that is, of a solution of hypochlorous acid or calcium hypochlorite, for example, in the form of chloride of lime. The bleach liquor for this purpose may be prepared from solid calcium hypochloride or chloride of lime by stirring the solid with water until all of the soluble matter present has gone into solution. The clear solution thus obtained may now be decanted from the insoluble matter. The proportions used in making the liquid may be about 35 pounds of chloride of lime and about 40 gallons of water. About 18 gallons of the clear liquor may be run through a pipe to the bottom of the tank containing about 3000 gallons of say 52 degrees Brix melt comprising the first filtrate. This will correspond, for example, to about 15,000 pounds of sugar solids in solution. During all this time the average temperature of the filtrate being treated may be kept at about 180 degrees F. more or less.

The mixture of melt and sterilizing agent may be agitated and then permitted to stand for about 15 minutes in order to permit the sterilizing action to complete itself. At the end of this time any iron or calcium present in the melt may be precipitated by the addition of a mixture of monosodium and disodium phosphate. For example, to every three thousand gallons of filtrate at a density of about 52 degrees Brix may be added about 37½ pounds of disodium phosphate in the crystalline condition, corresponding to approximately 14½ pounds of anhydrous disodium phosphate and about 11 pounds of the mono-sodium phosphate which is used in the form of the solid. The temperature may be raised at this stage of the operation from about 180 degrees to about 195 degrees F. During and for a brief period after the addition of the monosodium and disodium phosphates or their equivalents, the filtrate being treated is vigorously agitated. After the precipitation is completed, the agitation may be stopped for a period of about 20 minutes in order to permit the precipitates to agglomerate.

Thereafter the mixture may be further agitated and a suitable quantity of a purifying and filtering medium, such as a vegetable decolorizing carbon may be added to the mixture of melt and precipitate. For example, in the case of "suchar", we may add an amount of decolorizing carbon equal to about 2 per cent. of the weight of the sugar solids present in the melt. The mixture is then pumped through a second auto filter and the clear liquor comprising the second filtrate thus obtained run through a bag filter and then through a felt and paper filter to a storage tank. From the storage tank it may run into an evaporator, where as is usual, it is desired to increase its density or concentration as to about 37 degrees Beaumé corresponding to about 68 degrees Brix.

The hydrogen ion concentration corresponding to certain pH readings varies considerably. As already indicated the pH reading of the raw sugar melt may be equal to about 6.3. The pH reading of the first filtrate may equal about 5.0. The pH reading of the second filtrate is about the same and also the pH reading of the final sirup will be about 5.0 unless it has been changed to raise it to about the point of neutrality, corresponding to a pH reading of about 7.0, by adding trisodium phosphate which will raise the pH reading to the desired point.

The concentration of the sirup preferably takes place under vacuum, the temperature being about 110 degrees F. or less. In those cases where the pH reading is corrected in the evaporator it is desirable to add the trisodium phosphate or its equivalent to the sirup when its density has been raised from about 60 to about 62 degrees Brix.

This completes the description of the aforesaid illustrative embodiments of the methods of the present invention. It will be noted that such methods are simple, may be easily and conveniently practiced and have the numerous advantages and economies set forth in detail above. It will also be noted that the result is a sirup of desired density, hydrogen ion concentration and freedom from undesirable taste, odor, and color. It will be noted further that the sirup is produced directly from raw sugar without subsequent crystallization. This is a feature of great importance. It will be noted also that the original invert sugar content of the washed raw sugars melt may be slightly increased due to a controlled inversion of the sucrose in the melt and as present in the final sirup, a feature which adds to the economy of the methods of the present invention and also adds to certain of the desirable properties of the final sirup. Other superiorities and advantages of the methods of the present invention and of the resulting products will readily occur to those skilled in the art to which the present invention relates.

What we claim as our invention is:

1. The method of preparing refined sucrose sirups which comprises the steps of treating a sucrose melt first with a decolorizing carbon and, after filtering the melt so treated, treating the same with an oxidizing agent capable of delivering nascent chlorine to render a part at least of the impurities therein more readily adsorbable.

2. The method of preparing refined sucrose sirups which comprises the steps of treating a sucrose melt first with a decolorizing carbon and, after filtering the melt so treated, treating the same with an oxidizing agent to render a part at least of the impurities therein more readily adsorbable.

3. The method of preparing refined sucrose sirups which comprises the steps of treating a sucrose melt first with a decolorizing carbon and, after filtering the melt so treated, treating the same with chloride of lime to render a part at least of the impurities therein more readily adsorbable.

4. The method of preparing refined sucrose sirups which comprises the steps of treating a sucrose melt first with a decolorizing carbon and, after filtering the melt so treated, treating the same with an oxidizing agent capable of delivering nascent oxidizing matter to render a part at least of the impurities therein more readily adsorbable.

5. The method of preparing refined sucrose sirups which comprises the steps of treating a sucrose melt first with a solid subdivided purifying and filtering agent then treating the same with an oxidizing agent capable of delivering nascent chlorine to render a part at least of the impurities therein more readily adsorbable and thereafter treating the melt so obtained with a decolorizing carbon to remove a part at least of the adsorbable impurities.

6. The method of preparing refined sucrose sirups which comprises the steps of treating a sucrose melt first with a solid subdivided purifying and filtering agent then treating the same with an oxidizing agent to render a part at least of the impurities therein more readily adsorbable and thereafter treating the melt so obtained with a decolorizing carbon to remove a part at least of the adsorbable impurities.

7. The method of preparing refined sucrose sirups which comprises the steps of treating a sucrose melt first with a solid subdivided purifying and filtering agent then treating the same with chloride of lime to render a part at least of the impurities therein more readily adsorbable and thereafter treating the melt so obtained with a decolorizing carbon to remove a part at least of the adsorbable impurities.

8. The method of preparing refined sucrose sirups which comprises the steps of treating a sucrose melt first with a solid subdivided purifying and filtering agent then treating the same with an oxidizing agent capable of delivering nascent oxidizing matter to render a part at least of the impurities therein more readily adsorbable and thereafter treating the melt so obtained with a decolorizing carbon to remove a part at least of the adsorbable impurities.

9. The method of preparing refined sucrose sirups which comprises the steps of treating a sucrose melt first with a decolorizing carbon and, after filtering the melt so treated, treating the same with chloride of lime to render a part at least of the impurities therein more readily adsorbable, and thereafter treating the melt so obtained with a decolorizing carbon and then filtering the melt to which said decolorizing carbon has been added.

10. The method of preparing refined sucrose sirups which comprises the steps of treating a sucrose melt first with a decolorizing carbon and, after filtering the melt so treated, treating the same with an oxidizing agent capable of delivering nascent chlorine to render a part at least of the impurities therein more readily adsorbable, and thereafter treating the melt so obtained with a decolorizing carbon and then filtering the melt to which said decolorizing carbon has been added.

11. The method of preparing refined sucrose sirups which comprises the steps of treating a sucrose melt first with a decolorizing carbon and, after filtering the melt so treated, treating the same with an oxidizing agent capable of delivering nascent oxidizing matter to render a part at least of the impurities therein more readily adsorbable, and thereafter treating the melt so obtained with a decolorizing carbon and then filtering the melt to which said decolorizing carbon has been added.

12. The method of preparing refined sucrose sirups which comprises the steps of treating a sucrose melt first with a decolorizing carbon and, after filtering the melt so treated, treating the same with an oxidizing agent to render a part at least of the impurities therein more readily adsorbable, and thereafter treating the melt so obtained with a decolorizing carbon and then filtering the melt to which said decolorizing carbon has been added.

13. The method of preparing refined sucrose sirups which comprises the steps of treating a sucrose melt first with a decolorizing carbon and, after filtering the melt so treated, treating the same with chloride of lime to render a part at least of the impurities therein more readily adsorbable, then adding a reagent to precipitate the calcium of the chloride of lime, and thereafter treating the melt so obtained with a decolorizing carbon and then filtering the melt to which said decolorizing carbon has been added.

14. The method of preparing refined sucrose sirups, which comprises the steps of preparing a washed raw sugar melt of about 99 degrees polarization, treating said washed raw sugar melt with a reagent to obtain a melt of diminished hydrogen ion concentration, purifying the melt so treated with a vegetable carbon to obtain a preliminary partially purified filtrate, sterilizing said preliminary partially purified filtrate, treating said sterilized filtrate with an additional amount of a vegetable carbon to obtain a final purified filtrate, and thereafter increasing the density of said final purified filtrate to obtain a final sirup having a density of about 68 degrees Brix.

15. The method of preparing refined sucrose sirups which comprises the steps of preparing a washed raw sugar melt of about 99 degrees polarization, treating said washed raw sugar melt with a slight excess of disodium phosphate to obtain a melt of diminished hydrogen ion concentration, purifying the melt so treated with an amount of a vegetable carbon equal to about two per cent. based upon the weight of sugar solids present in said melt of diminished hydrogen ion concentration to obtain a preliminary partially purified filtrate, sterilizing said preliminary partially purified filtrate by treating the same with chloride of lime, treating said sterilized filtrate with an additional amount of a vegetable carbon also equal to about two per cent. based upon the weight of the sugar solids present in said sterilized filtrate to obtain a final purified filtrate, and thereafter increasing the density of said final purified filtrate by evaporation to obtain a final sirup having a density of about 68 degrees Brix.

In testimony whereof, we have signed our names to this specification.

EUGENE N. EHRHART.
LEONARD WICKENDEN.